US007284629B2

(12) United States Patent
Nakano et al.

(10) Patent No.: US 7,284,629 B2
(45) Date of Patent: Oct. 23, 2007

(54) INTAKE SYSTEM STRUCTURE FOR VEHICLE

(75) Inventors: Nobuhiko Nakano, Wako (JP); Akihiro Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 10/999,146

(22) Filed: Nov. 30, 2004

(65) Prior Publication Data

US 2005/0133289 A1 Jun. 23, 2005

(30) Foreign Application Priority Data

Dec. 1, 2003 (JP) ............................ 2003-402299

(51) Int. Cl.
*B60K 13/02* (2006.01)

(52) U.S. Cl. .................. 180/68.3; 180/68.1; 180/68.2; 123/198 E

(58) Field of Classification Search ................ 180/225, 180/68.3, 68.2, 68.1; 123/198 E
See application file for complete search history.

(56) References Cited

U.S. PATENT DOCUMENTS

| | | | | |
|---|---|---|---|---|
| 4,611,679 | A * | 9/1986 | Yanagishita et al. | 180/68.3 |
| 4,878,555 | A * | 11/1989 | Yasunaga et al. | 180/68.3 |
| 5,174,258 | A * | 12/1992 | Tanaka | 123/198 E |
| 6,287,354 | B1 * | 9/2001 | Nozaki | 55/385.3 |
| 6,537,338 | B2 * | 3/2003 | Inoue et al. | 55/385.3 |
| 6,615,945 | B2 * | 9/2003 | Minami et al. | 180/219 |
| 6,622,806 | B1 * | 9/2003 | Matsuura | 180/68.1 |
| 6,695,083 | B2 * | 2/2004 | Nakamura et al. | 180/68.1 |
| 6,920,949 | B2 * | 7/2005 | Matsuura et al. | 180/68.2 |
| 6,959,934 | B2 * | 11/2005 | Rioux et al. | 180/68.3 |
| 7,044,253 | B2 * | 5/2006 | Takenaka et al. | 180/219 |

FOREIGN PATENT DOCUMENTS

| | | |
|---|---|---|
| JP | 2534228 | 6/1996 |

* cited by examiner

*Primary Examiner*—Christopher P. Ellis
*Assistant Examiner*—John D Walters
(74) *Attorney, Agent, or Firm*—Westerman, Hattori, Daniels & Adrian, LLP.

(57) ABSTRACT

A four-wheeled buggy includes a shortened air intake path so that intake efficiency is improved. An air cleaner is disposed in a space surrounded on the left and right by a rear fender below a seat, and a space surrounded by the air cleaner, the seat and left and right portions of the rear fender is formed as an intake air path. A cutaway portion is provided on a side face of the rear fender connecting to a seat rail and is formed as an intake opening communicating outwardly sidewardly such that it is communicated with the intake air path on the inner side. External air taken in from the intake opening enters the intake path and is immediately introduced into the inside of the air cleaner through an intake duct.

18 Claims, 15 Drawing Sheets

INTAKE SYSTEM STRUCTURE FOR VEHICLE

FIELD OF THE INVENTION

This invention generally relates to an intake structure suitable for a vehicle such as a four-wheeled buggy, and more particularly to an intake structure wherein an intake air path is shortened to improve the intake efficiency.

BACKGROUND OF THE INVENTION

In general, an intake structure for a four-wheeled buggy is known wherein an intake air path is formed between a fuel tank and a tank cover which covers the fuel tank. An intake structure of this type takes in external air from an intake opening provided at a comparatively high position forwardly of a vehicle body. The air is then introduced into an air cleaner below a seat through the intake air path. One example of such an intake structure is disclosed in Japanese Patent No. 2,534,228.

Where air is taken in from forwardly of the vehicle body, a long intake air path is required, and therefore, it is not easy to raise the intake efficiency. In addition, it is necessary to assure a space for the long intake air path.

It is considered that in order to overcome the intake inefficiency problem, the intake opening is provided at a comparatively high position and the intake air path is shorter. However, one problem with providing the intake opening at a comparatively high position and making the intake air path shorter, is that the intake opening may be visible from the outside, which detracts from the appearance. It is therefore an object of the present invention to overcome such problems.

SUMMARY OF THE INVENTION

The present invention addresses the above described condition, and an object of the present invention is to provide an air intake system of an engine, with an improved physical appearance, capable of improving intake efficiency.

According to the present invention, there is provided an intake system structure for a vehicle; comprising a vehicle body frame; an intake system support member; and a vehicle body cover member, wherein an intake air path is formed on the inner side of the vehicle body cover member. The vehicle body cover member serves, at a portion thereof, as an intake air path wall portion which forms part of a wall portion of the intake air path. The intake air path wall portion is supported at an end portion thereof on the intake system support member of the vehicle body frame such that an opening is formed between the end portion of the intake air path wall portion and the intake system support member so as to serve as an intake opening for establishing communication between the external air and the intake air path, and the outer side of at least part of the intake opening is covered with the other portion of the vehicle body cover member.

In a second aspect of the present invention, the vehicle body cover member is a rear fender which covers a rear wheel of the saddle type vehicle; the intake system support member is a pair of left and right seat rails provided for supporting a seat; the intake air path wall portion is a pair of left and right vertical wall portions provided at a position of the rear fender below the seat and extending along the left and right seat rails; the intake air path is surrounded by the seat, intake system part and left and right vertical wall portions; and the intake opening is formed from a cutaway portion of each of the vertical wall portion provided adjacent a connecting face of the vertical wall portion to the seat rail.

In a third aspect of the invention, a plurality of intake openings is provided between the seat rails and the rear fender.

In a fourth aspect of the invention, the intake opening is open toward a side of the vehicle body.

In a fifth aspect of the invention, the intake system part includes an air cleaner, a connecting tube for the air cleaner, and a dust cover, and the dust cover is disposed between left and right vehicle body frames and is locked to support brackets provided on the left and right vehicle body frames and an engaging projection provided on the connecting tube.

In a sixth aspect of the invention, the intake opening is formed from a cutaway portion provided in an opposing relationship to a wheel well.

In a seventh aspect of the invention, the intake opening is provided on the inner side with respect to left and right wheel well.

In an eighth aspect of the invention, the intake system part includes an air cleaner, and an upper lid opening opened for air intake is provided in an upper lid of the air cleaner.

In a ninth aspect of the invention, a member for protecting a filter element provided in the air cleaner from mud, water and so forth is provided in the upper lid opening.

According to the first aspect of the present invention, the intake opening is formed between the intake path wall portion which is part of the vehicle body cover member and the intake system support member, and the intake air path can be shortened to raise the intake efficiency. Because the intake opening is covered from the outer side thereof with the other portion of the vehicle body cover member, even if the intake opening is provided at a comparatively high position on a side face of the vehicle body or the like, it can be formed at a position at which it cannot be observed readily from the outside. Thus a good appearance can be maintained.

According to the second aspect of the invention, since the intake opening is formed on the connecting face of the rear fender and the seat frame and formed as a recessed cutaway portion in one embodiment of the invention, the intake opening can be formed readily and the intake path can be shortened. Further, even if the intake opening is provided at a comparatively high position, it can be prevented from being observed readily from the outside.

According to the third aspect of the invention, since a plurality of intake openings are provided between the seat rails and the rear fender in one embodiment of the invention, the intake efficiency can be further enhanced. Also, since the intake openings can be formed over a comparatively long range along the seat rails, the plurality of intake openings can be formed readily.

According to the fourth aspect of the invention, since the intake opening is open toward a side of the vehicle body, the intake path can be shortened as far as possible by introducing external air from the sideward direction of the vehicle body. Because the intake opening is provided on the side face, it cannot be observed readily. Thus, good appearance can be maintained.

According to the fifth aspect of the invention, since the dust cover is attached between the left and right vehicle body frames making use of the support brackets of the vehicle body frames and the projection of the connecting tube, the dust cover can be attached more simply without increasing the number of parts very much.

According to the sixth aspect of the invention, since the intake opening is formed from the cutaway portion provided in an opposing relationship to the wheel well, the intake opening can be formed readily at a position at which it can be observed comparatively less likely. Thus good appearance can be maintained.

According to the seventh aspect of the invention, since the intake opening is provided on the inner side with respect to the left and right wheel well, it can be open to a position at which it cannot be observed from the outside, and the appearance can be improved.

According to the eighth aspect of the invention, since an air cleaner is provided as the intake system part and the upper lid opening opened for air intake is provided in the upper lid of the air cleaner, a large amount of air can be taken into the air cleaner. Consequently, the intake efficiency is enhanced.

According to the ninth aspect of the invention, since the member for protecting the filter element provided in the air cleaner from mud, water and so forth is provided in the upper lid opening, the filter element can be protected from mud, water and so forth. Consequently, the intake efficiency is enhanced.

BRIEF DESCRIPTION OF THE DRAWINGS

A preferred embodiment of the present invention will be described with reference to the accompanying drawings, wherein.

DETAILED DESCRIPTION OF THE INVENTION

In the following, an embodiment wherein the present invention is applied to a four-wheeled buggy is described. It is to be noted that, in the present application, the forward and backward, leftward and rightward, and upward and downward directions are given with reference to the vehicle body when the vehicle is in a state traveling forward.

Figure 1:
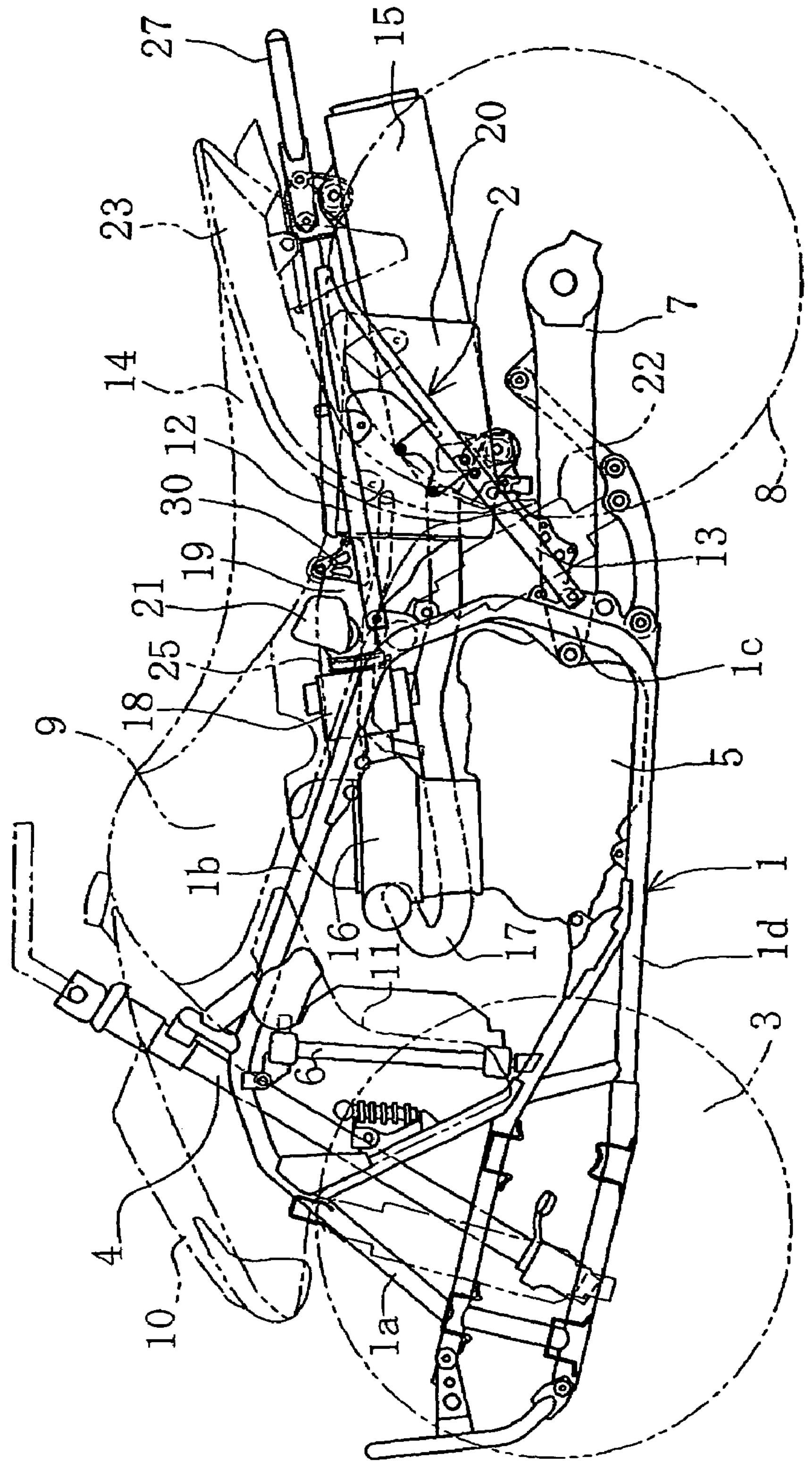
FIG. 1 is a side elevational view of a four-wheeled buggy.

FIG. 1 is a side elevational view of a four-wheeled buggy, and a vehicle body frame includes a main frame 1 having a substantially closed loop shape as viewed in side elevation, and a rear frame 2 having a truss structure of a substantially triangular shape as viewed in side elevational and extending rearwardly from the main frame 1.

The main frame 1 is formed from a pipe member made of a suitable metal such as a light alloy and includes a front pipe 1*a*, an upper pipe 1*b*, a pivot pipe 1*c* and a lower pipe 1*d*. Front wheels 3 are supported on the left and right of a front portion of the main frame 1 and are steered by a steering shaft 4 disposed in an obliquely upward and downward direction. An engine 5 is supported on a rear portion side of the main frame 1, and a radiator 6 is supported forwardly of the engine 5.

The pivot pipe 1*c* is positioned rearwardly of the engine 5 and disposed in an upward and downward direction. A rear swing arm 7 is supported at a front end portion thereof for rocking motion on the pivot pipe 1*c*, and a pair of left and right rear wheels 8 are supported at a rear end portion of the rear swing arm 7. A fuel tank 9 is supported on the upper pipe 1*b* above the engine 5. A front portion of the vehicle body is covered with a front cowl 10 and a front fender 11.

The rear frame 2 includes seat rails 12 extending obliquely upwardly rearwards from upper portion of a rear end of the upper pipe 1*b*, and rear stays 13 extending obliquely upwardly rearwards from lower portions of the pivot pipe 1*c* and connecting to rear portions of the seat rails 12. The seat rails 12 and the rear stays 13 are pipe members made of a material similar to that of the main frame 1. A seat 14 is supported on the seat rails 12. Further, an exhaust muffler 15 is disposed on one side of the vehicle body (in the present example, on the right side of the vehicle body) in an overlapping relationship with the rear wheels 8 as viewed in side elevation. The muffler 15 is supported on the seat rails 12.

An exhaust pipe 17 is connected at a rear end thereof to a front end of the muffler 15. The exhaust pipe 17 extends forwardly from an exhaust port provided on a front face of a cylinder head 16 of the engine 5, passes sidewardly of the engine 5 and extends rearwardly. An intake port is provided on a rear face of the cylinder head 16, and a carburetor 18 is connected to the intake port. The carburetor 18 takes in clean air from an air cleaner 20 through a connecting tube 19. Reference numeral 21 denotes a sound absorbing chamber, 22 a rear cushion, and 23 a rear fender.

Figure 2:
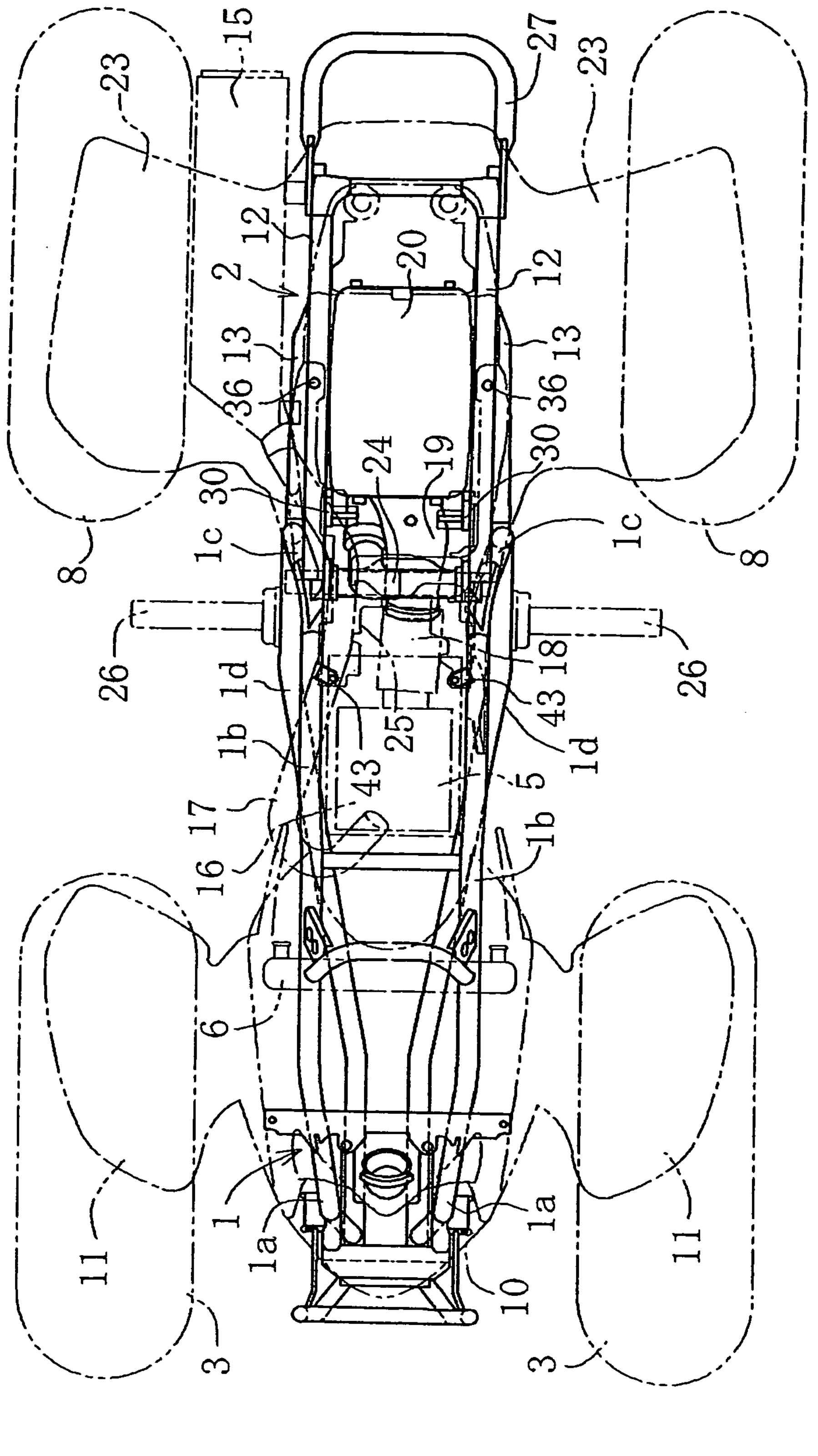
FIG. 2 is a plane view of essential part of a vehicle body of the four-wheeled buggy.

FIG. 2 is a plan view of essential parts of the vehicle body structure of the four-wheeled buggy, and both of the main frame 1 and the rear frame 2 are formed from a pair of left and right pipe members. As can be seen apparently from FIG. 2, the air cleaner 20 is accommodated between the left and right rear frames 2. Reference numeral 24 denotes an intake duct, which extends forwardly from a front face of the air cleaner 20 and is open sidewardly. Further, the opening is positioned above an upper face of the connecting tube 19 but below a dust cover 25.

The dust cover 25 is attached to the left and right upper pipes 1*b* and the seat rails 12 and covers the connecting tube 19 and the intake duct 24 from above over a range to the front end of an upper face of the air cleaner 20. Spaces above the air cleaner 20 and the dust cover 25 form an intake air path, which introduces external air from sidewardly of the rear fender 23 above the air cleaner 20 and guides the air to the intake duct 24. Reference numeral 26 denotes a step bar, and 27 a rear carrier.

Figure 3:
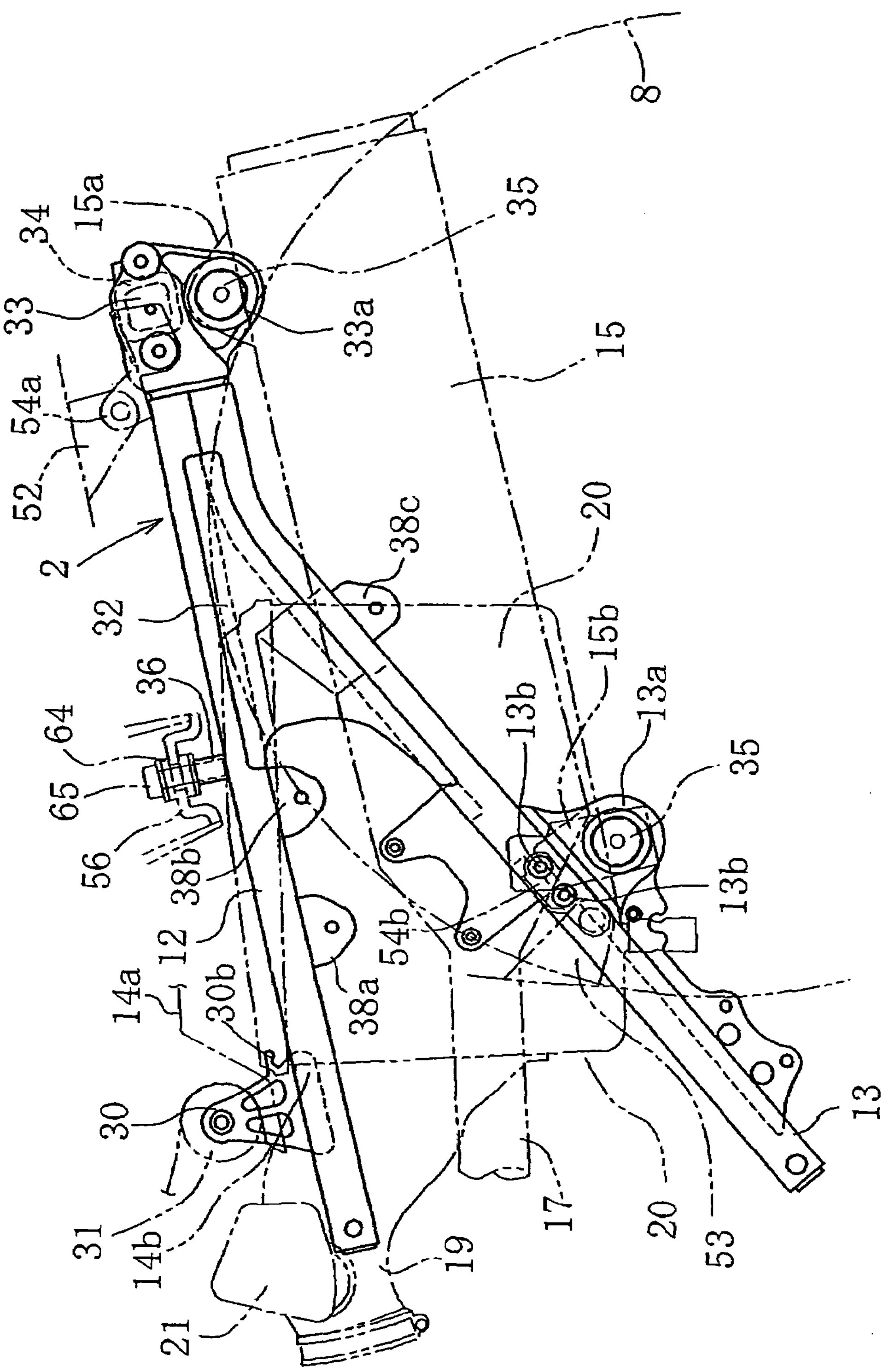
FIG. 3 is a side elevational view of a rear frame.

FIG. 3 is a side elevational view of the rear frames 2, and a damper bracket 30 is welded to a position rather near to a front end portion of the seat rail 12 and a rubber damper member 31 is attached to an upper end portion of the damper bracket 30. A hook 14*b* provided on a lower face of a bottom plate 14*a* of the seat 14 is engaged with the rubber damper member 31. The hook 14*b* has a portion which projects forwardly and the rubber damper member 31 is fitted between the portion of the hook 14*b* and the seat bottom plate, which is a known structure.

The seat rail 12 and the rear stay 13 are placed one on the other such that they define an acute angle therebetween at a rear portion of the rear frame 2, and are integrated with each other by welding and reinforced by a gusset 32. Carrier brackets 33 are welded to rear end portions of the left and right rear frames 2, and a rear carrier 27 is bolted at front end portions thereof to the carrier brackets 33 (refer to FIG. 2). A cross bar 34 is supported between the left and right carrier brackets 33.

A bush mount portion 33*a* is provided on that one of the carrier brackets 33 which is on the right side of the vehicle body, and a bush 35 is attached by fitting to the bush mount portion 33*a*. A stay 15*a* formed so as to project on an upper face of a rear end portion of the muffler 15 is attached to the bush 35 by means of a bolt to support the muffler 15 for vibration absorption. A similar bush mount portion 13*a* is provided on the front end portion side of the rear stay 13 on the right side of the vehicle body, and the muffler 15 is supported for vibration absorption at a front end portion thereof by a bush 35 fitted in the bush mount portion 13*a*.

Reference character 15*b* denotes a stay provided on the front end portion side of the muffler 15. Reference characters 38*a*, 38*b*, 38*c* denote stays for attaching the air cleaner 20. Further, reference character 13*b* denotes a nut for attaching a bracket (hereinafter described) for supporting the rear fender 23, and the nuts 13*b* are provided at a lower portion of a side face of the rear stay 13.

Figure 4:
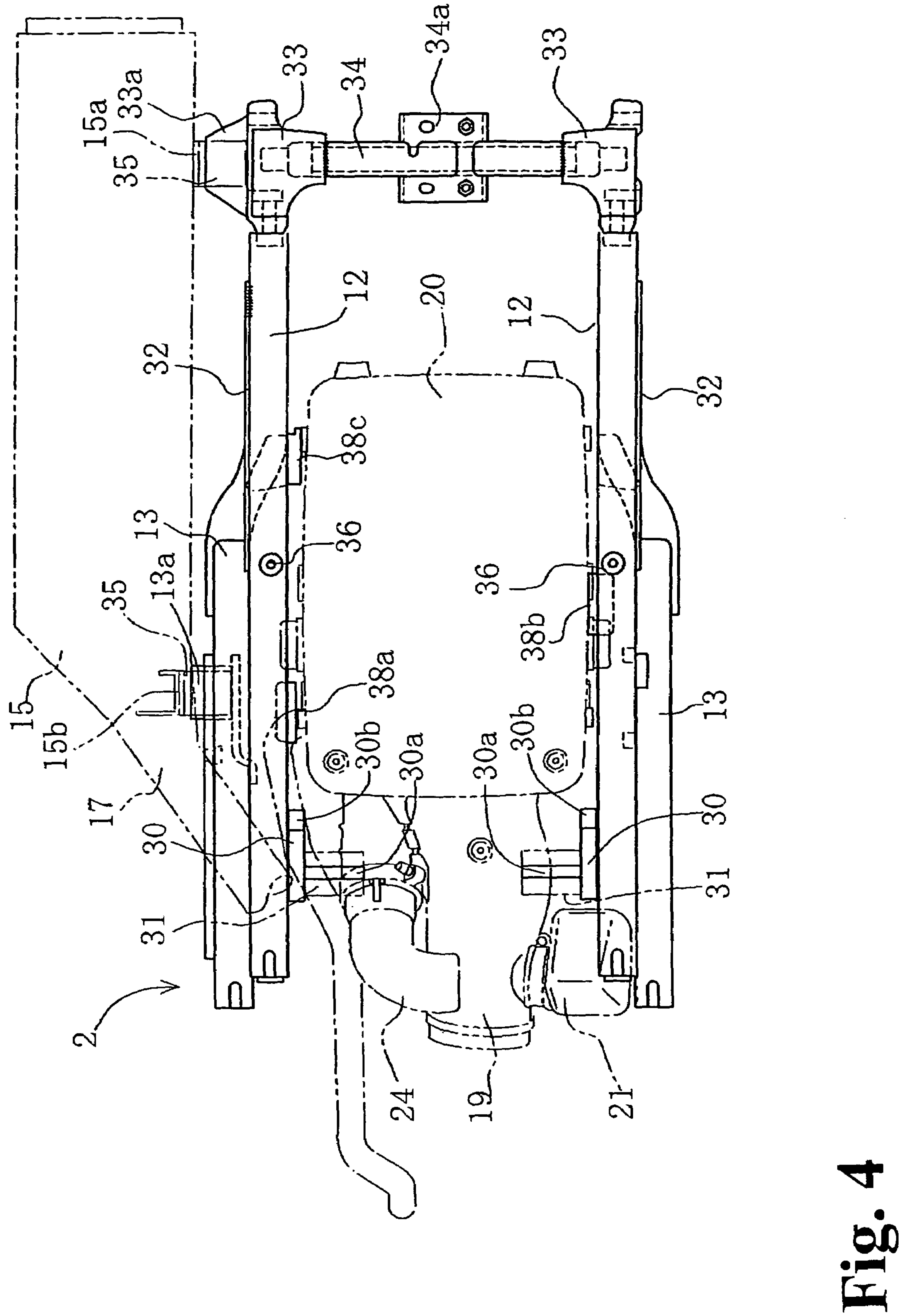
FIG. 4 is a plane view of the rear frame.

FIG. 4 is a plan view of the rear frame 2. As can be recognized apparently from FIG. 4, since the muffler 15 which is a heavy article is disposed only on the right side of the vehicle body, the bush mount portion 33*a* is provided on the seat rail 12 on the right side of the vehicle and the bush mount portion 13*a* is provided on the rear stay 13 on the right side of the vehicle body.

A support shaft 30*a* is provided on the upper end portion of each of the left and right damper brackets 30 and projects inwardly of the vehicle body, and the rubber damper members 31 are attached to the support shafts 30*a*. The rubber damper members 31 are engaged with the hooks 14*b* (FIG. 3) provided on the bottom plate of the seat 14 to support a front portion of the seat 14 for vibration absorption. A locking projection 30*b* is provided integrally on each of the damper brackets 30.

Reference numeral 36 denotes an attaching boss for the rear fender 23, and the attaching bosses 36 are provided in an upwardly projecting manner at intermediate portions in the forward and backward direction of upper faces of the left and right seat rails 12. Reference character 34*a* denotes a support plate for a seat lock to a rear end portion of the seat 14.

Figure 5:
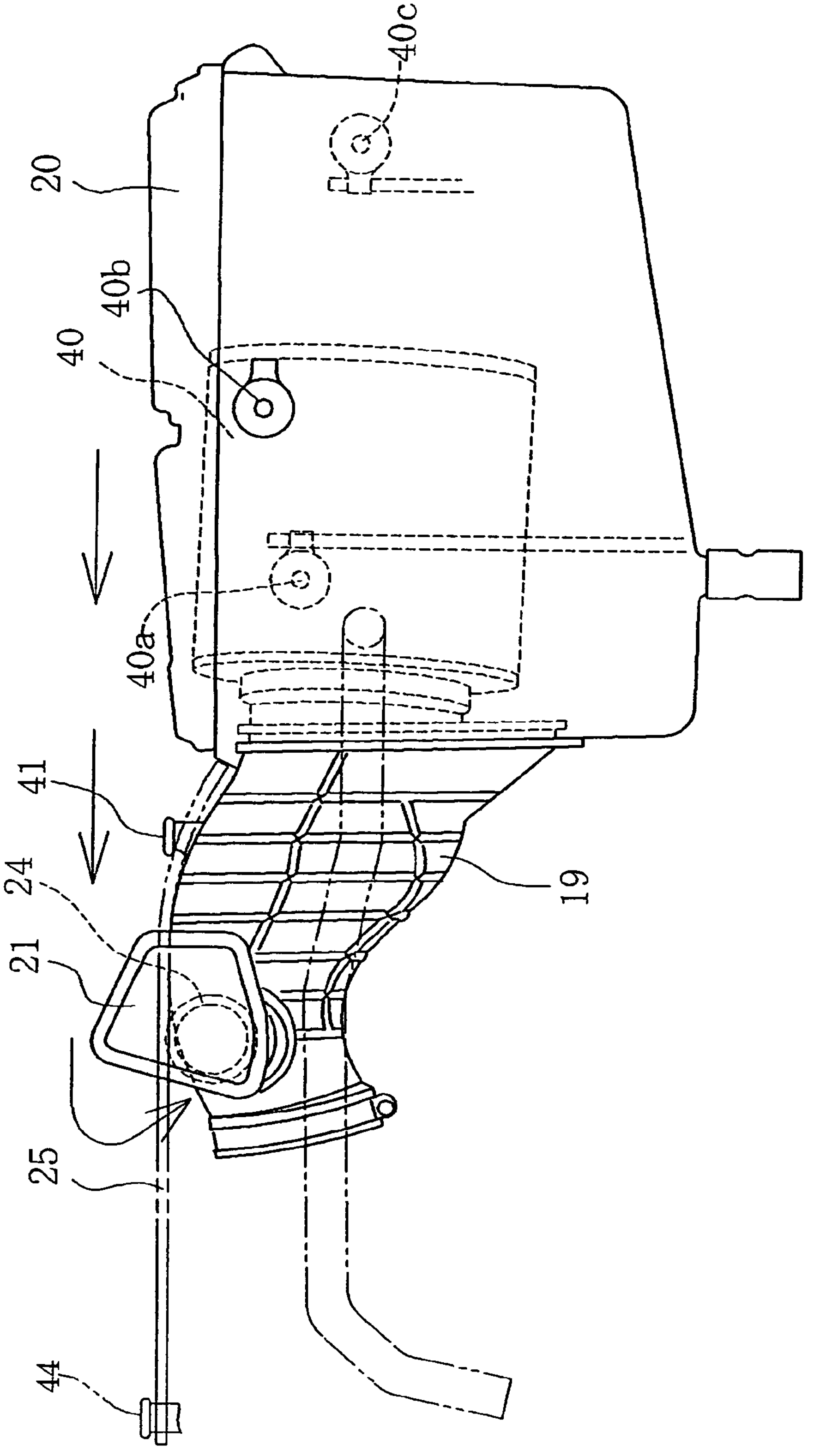
FIG. 5 is a side elevational view of an air cleaner.

FIG. 5 shows a shape of a side face of the air cleaner 20. The air cleaner 20 is supported at left and right side faces thereof by the rear frames 2. Reference characters 40*a*, 40*b* and 40*c* are attaching portions provided on left and right side faces of the air cleaner 20 and are connected to the stays 38*a*, 38*b*, 38*c* of the rear frame 2. A filter element 40 is accommodated in the inside of the air cleaner 20 and purifies external air taken in through the intake duct 24. An end of the intake duct 24 is open to the upper face of the connecting tube 19, and the height thereof is substantially equal to that of the upper face of the connecting tube 19 such that the intake duct 24 overlaps with the connecting tube 19 as viewed in side elevation.

The connecting tube 19 is made of a suitable resin or a like material and has the sound absorbing chamber 21 provided on a side face on the front end side thereof. A locking projection 41 is provided integrally at an upper portion of the connecting tube 19 on the air cleaner 20 side such that it projects upwardly. The locking projection 41 is shaped such that an upper end thereof is swollen circumferentially like a flange. A rear end portion of the dust cover 25 is locked at the locking projection 41. The dust cover 25 is disposed such that it covers the connecting tube 19 and the intake duct 24 from above.

Figure 6:
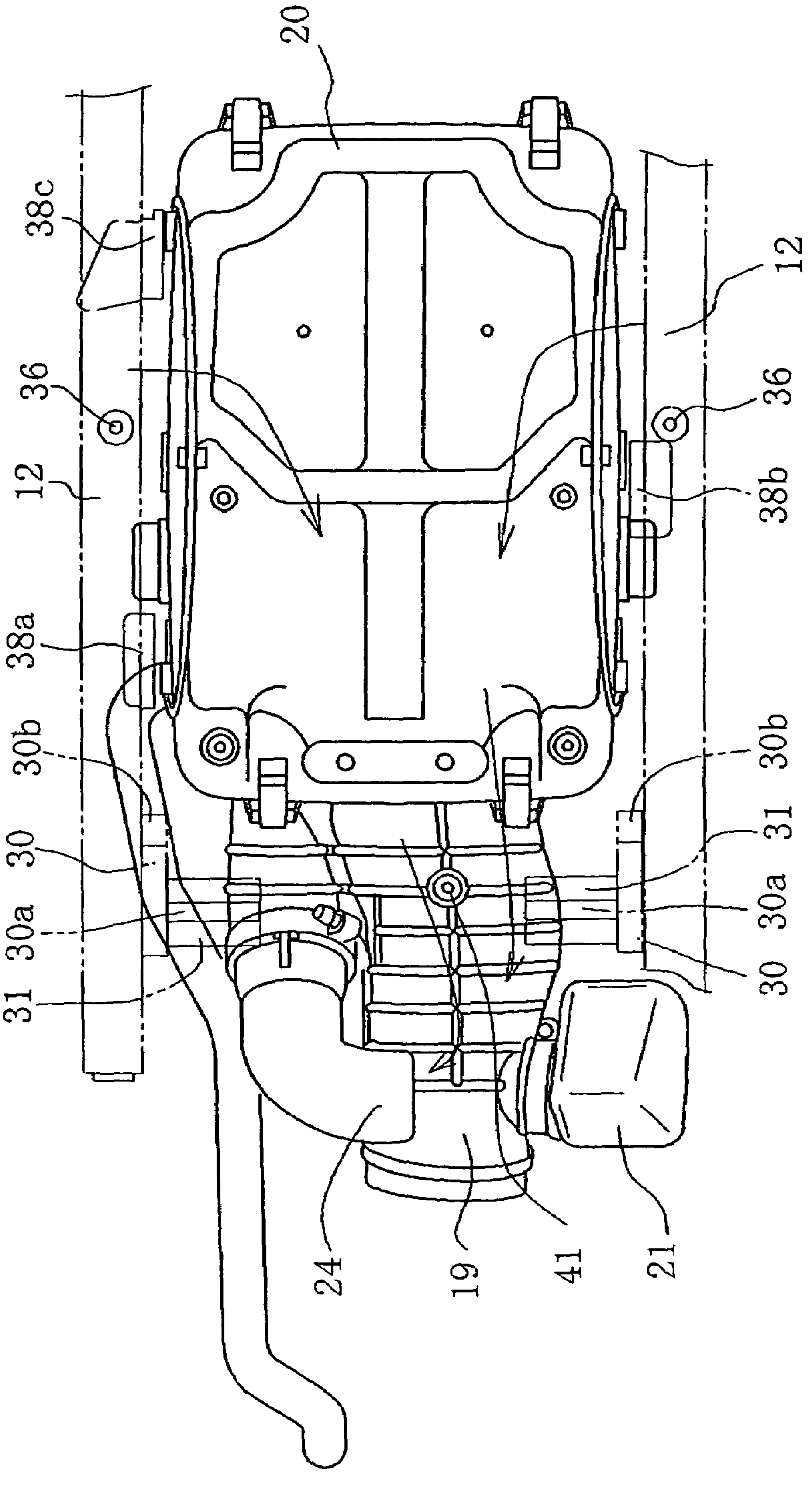
FIG. 6 is a plane view of the air cleaner.

FIG. 6 is a plan view of the air cleaner 20. The intake duct 24 is provided in a juxtaposed relationship with the connecting tube 19 on a front face of the air cleaner 20 such that it extends forwardly. An end of the intake duct 24 is bent sidewardly such that it overlaps above the connecting tube 19, and external air is introduced from here to the dirty side in the air cleaner 20. Arrow marks in FIGS. 5 and 6 indicate the flow of intake air. Specifically, external air introduced passes above the air cleaner 20 and the dust cover 25 and flows forwardly from a rearward direction until it is taken into the intake duct 24.

Figure 7:
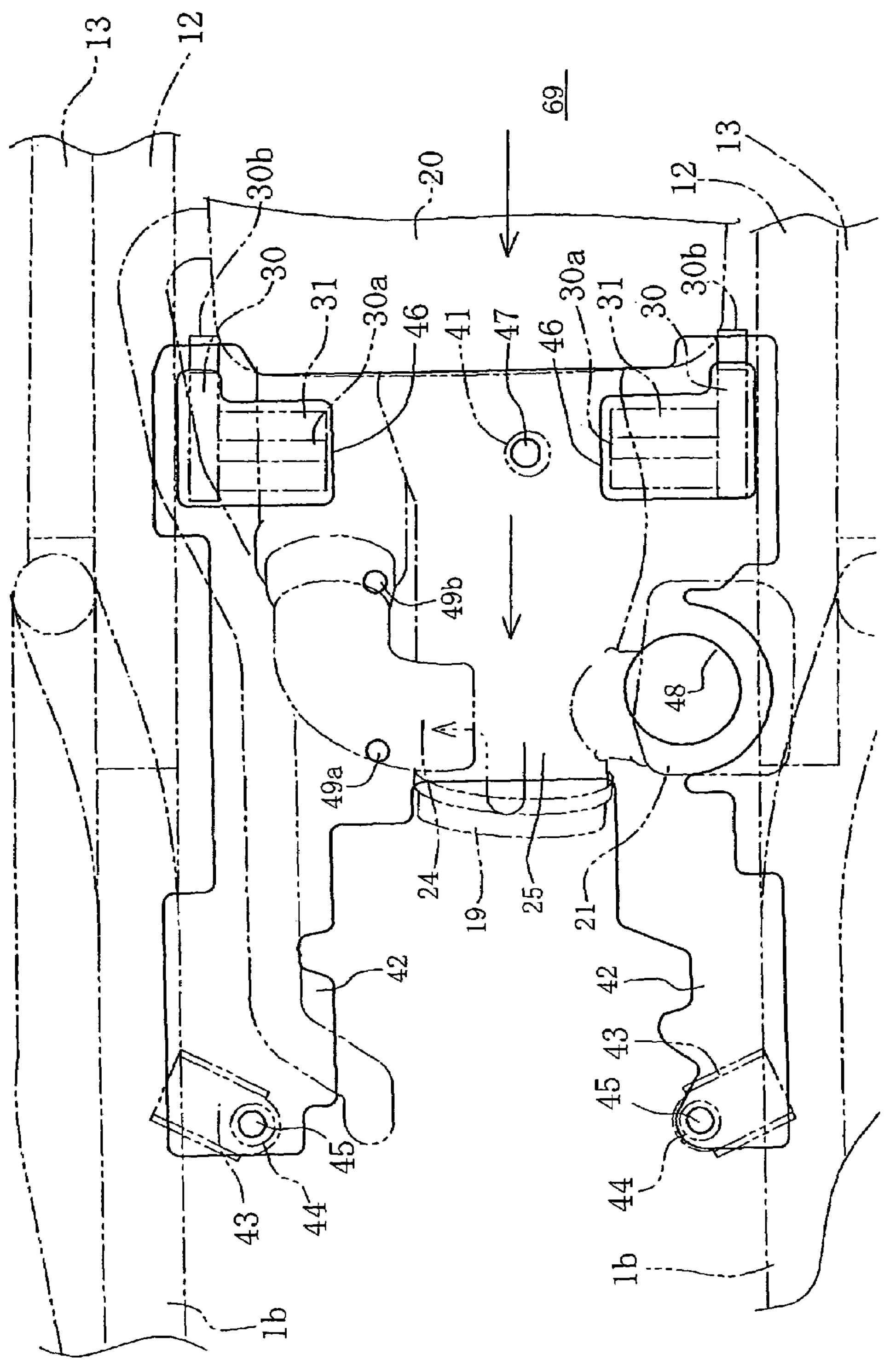
FIG. 7 is a plane view of a dust cover.

FIG. 7 shows a shape of the dust cover 25 in a plan view. The dust cover 25 is formed from a comparatively flexible material, such as rubber, in the form of a flat plate. A front end portion of the dust cover 25 is bifurcated leftwardly and rightwardly at a front end of the connecting tube 19 to form front side attaching portions 42, and locking holes 45 are provided in the front side attaching portions 42. The dust cover 25 is locked at the locking holes 45 to projections 44 of support brackets 43. The support brackets 43 are paired with each other and attached to the left and right upper pipes 1*b* by welding. The locking projections 30*b* (refer to FIG. 3) are provided integrally on rear portion sides of the damper brackets 30 such that they project rearwardly, and the dust cover 25 is locked with a higher degree of certainty by the locking projections 30*b*.

A rear end portion of the dust cover 25 forms a rear side attaching portion connecting to a front end upper portion of the air cleaner 20. Comparatively large locking holes 46 are provided on the left and right of the rear side attaching portion of the dust cover 25, and the damper brackets 30 and the rubber damper members 31 are fitted in the locking holes 46. Further, a locking hole 47 in the form of a round hole is formed at a portion of the dust cover 25 between the left and right locking holes 46, and the locking projection 41 is locked at the locking hole 47.

In particular, the dust cover 25 is removably attached only by engagement making use of the locking portions and the rubber damper members 31 provided on the vehicle body frame side and the connecting tube 19. Reference numeral 48 denotes a large round hole positioned above the sound absorbing chamber 21 on the left side of the vehicle body, and reference characters 49*a* and 19*b* denote small round holes positioned forwardly and backwardly on the right side of the vehicle body.

As seen from arrow marks indicating flows of intake air in FIG. 7, air flowing forwardly above the air cleaner 20 passes above the dust cover 25 until it comes to a front end of a central portion of the dust cover 25. The front end of the central portion of the dust cover 25 is positioned above a front end portion of the connecting tube 19 and the opening at the end of the intake duct 24 between the left and right front side attaching portions 42. Thus, the air goes round from the upper face side of the dust cover 25 to the lower side at the front end of the central portion of the dust cover 25 and enters the intake duct 24 through a narrow space between the upper face of the connecting tube 19 and the end of the intake duct 24 which is open to the curved face of the connecting tube 19.

At this time, the dust cover 25 functions as a kind of a baffle which causes the intake duct 24 not to suck the air directly from the intake air path above the air cleaner 20 but bend the intake air path. Consequently, the dust cover 25 efficiently removes dust and so forth having mixed into the air in the process wherein the intake air path curves.

Figure 8:
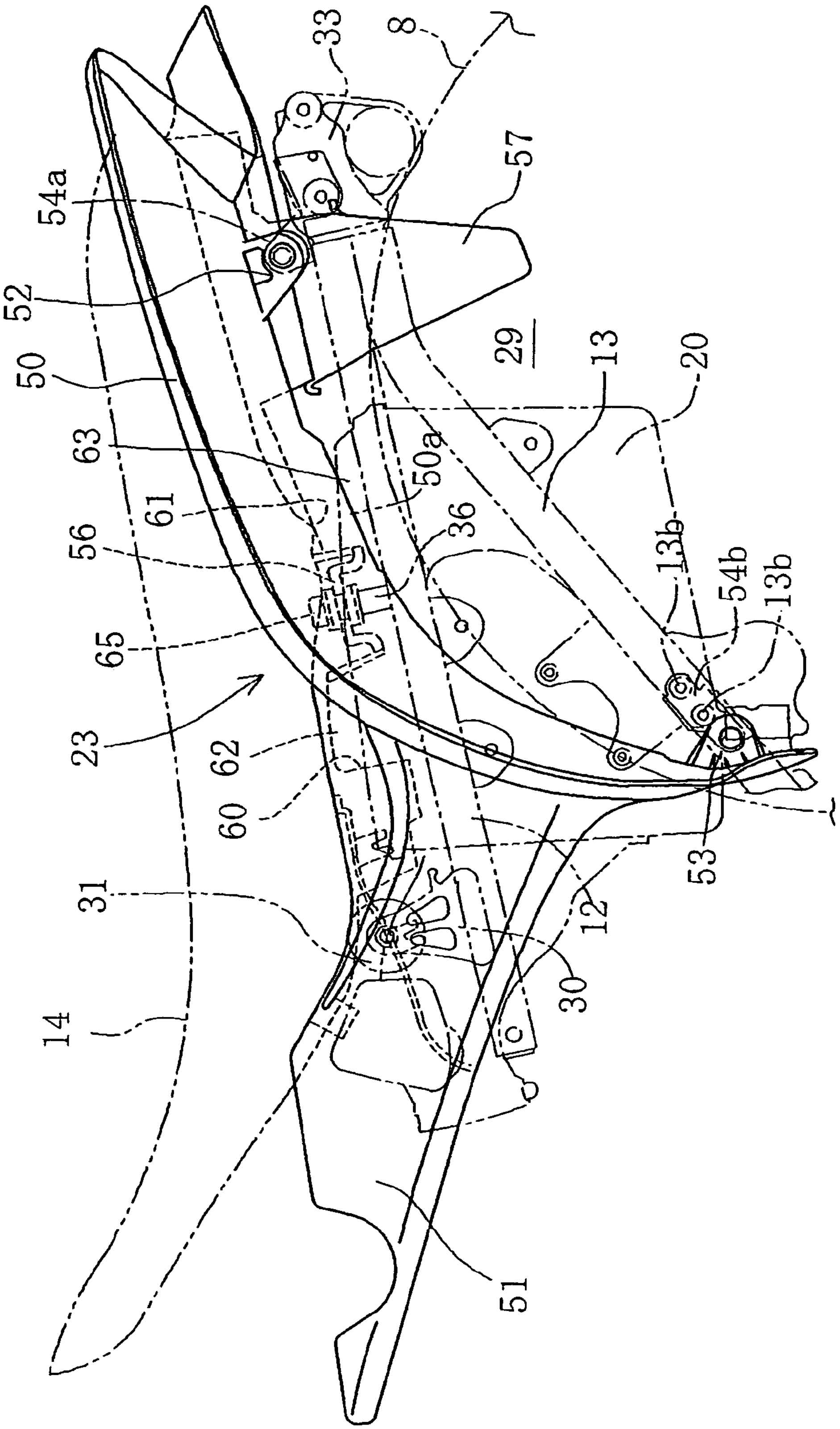
FIG. 8 is a side elevational view of a rear fender.

FIG. 8 is a side elevational view of the rear fender 23. The rear fender 23 is formed from a suitable resin material and includes a body portion 50 and a forward extension 51 formed integrally with each other. The body portion 50 covers a rear wheel over a range from a front portion to an upper portion. The forward extension 51 extends forwardly from a central portion of the body portion 50 with respect to the vehicle body and covers a lower portion of the fuel tank 9 below the front end of the seat 14 (refer to FIG. 1). A portion of the body portion 50 which is swollen to a location above a rear wheel 8 is curved and inclined such that the height thereof decreases toward the inner side of the vehicle body. A portion of the body portion 50 which is positioned on the most inner side forms a downwardly swollen portion 50*a* whose height decreases to such a degree that it covers a seat rail 12 as viewed in side elevation.

A stay 52 is formed integrally in a projecting manner at a rear portion of the body portion 50, and the body portion 50 is connected at the stay 52 thereof to a rear end portion of the seat rail 12 through a bracket 54*a*. The bracket 54*a* is tightened at an end thereof to a side face of a carrier bracket 33 together with an end portion of the carrier 27 (refer to FIG. 2). Further, another stay 53 is formed integrally in a projecting manner also at a lower portion of the front side of the body portion 50, and the body portion 50 is connected at the stay 53 thereof to a nut 13*b* provided on a side face of a rear stay 13 through a bracket 54*b*. The forward extension 51 covers a side face of the connecting tube 19.

Figure 9:
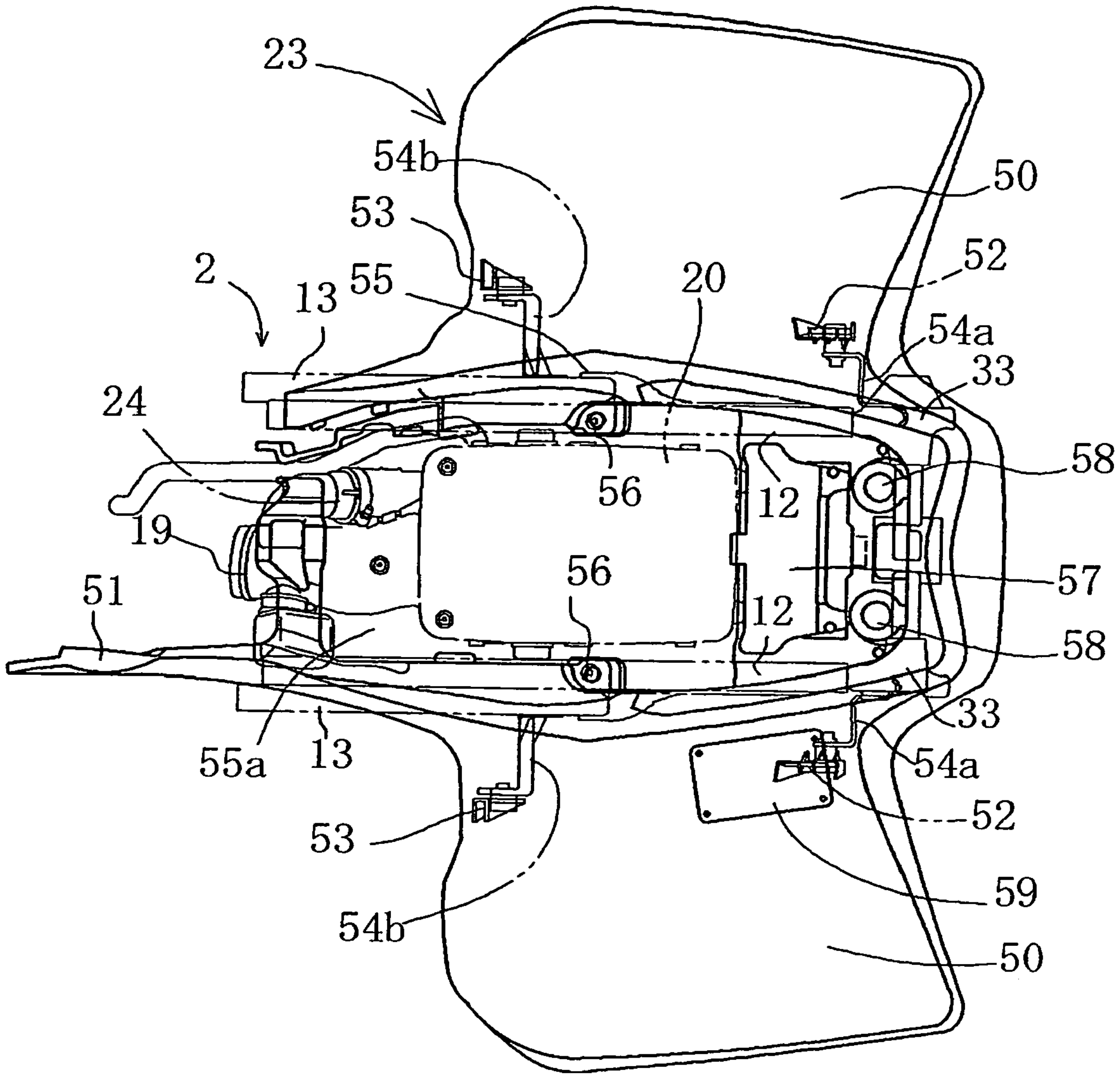
FIG. 9 is a plane view of the rear fender.

FIG. 9 is a plan view of the rear fender 23. A central portion 55 is formed integrally between the left and right body portions 50 such that it interconnects the body portions 50. A central opening 55*a* is formed in the central portion 55, and the air cleaner 20 is disposed in the central opening 55*a* and is covered from above with the seat. On the left and right of a central portion in the forward and backward direction of an edge portion of the central opening 55*a*, attaching portions 56 to the seat rails 12 are formed integrally.

The forward extension 51 is formed integrally as a portion which extends forwardly only from the left side of the central portion 55. Reference numeral 57 denotes a box portion which is formed integrally with and projects downwardly from a rear end portion side of the central portion 55. Reference numeral 58 denotes an attachment seat for a rubber cushion for supporting a rear end portion of the seat. Reference numeral 59 denotes a comparatively shallow container portion with a lid which is provided at a central portion of the left side of the vehicle body.

Figure 10:
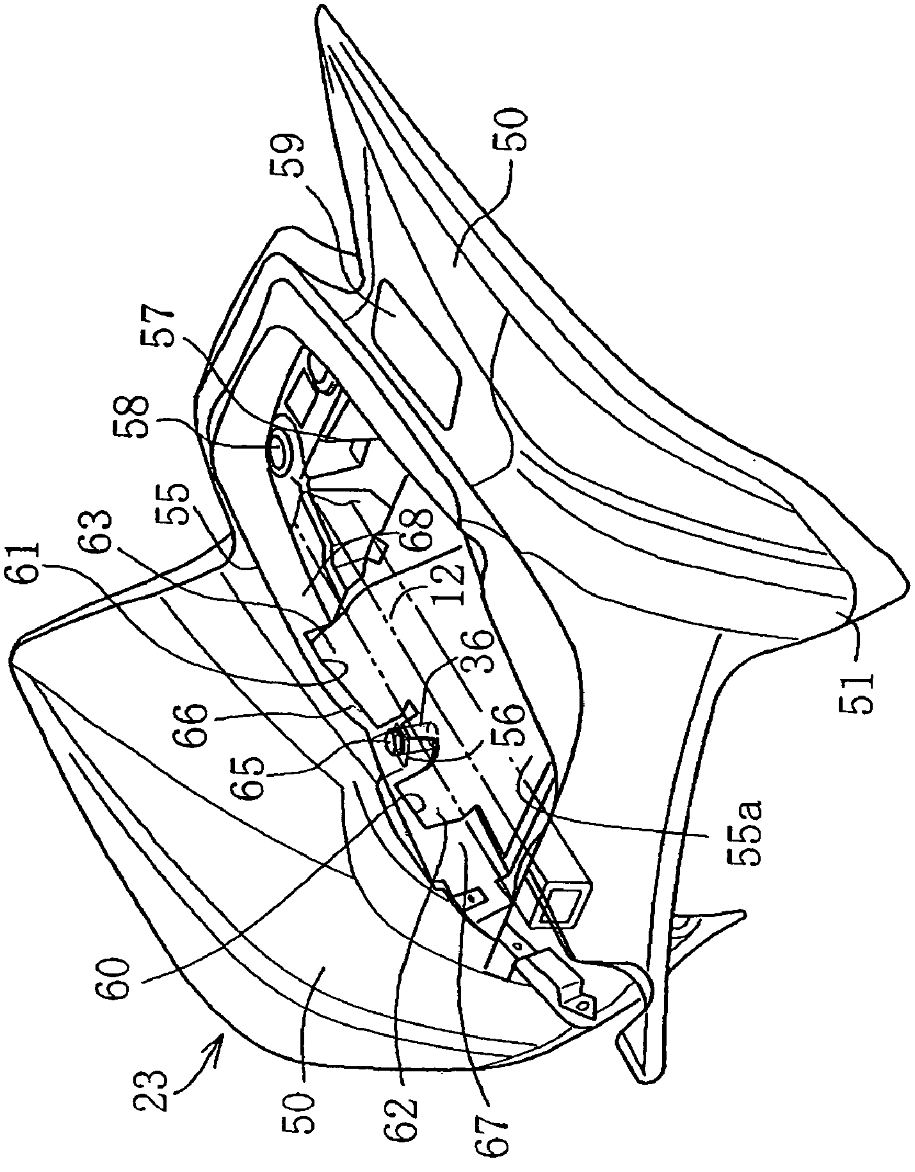
FIG. 10 is a perspective view of the rear fender.

FIG. 10 is a perspective view of the rear fender 23, and the attaching portions 56 are fastened to the attaching bosses 36 of the seat rails 12 by means of bolts 65. As can be seen apparently from FIG. 10, front and rear portions of the edge portion of the central opening 55*a* across the attaching portions 56 exhibit cutaway portions 60, 61, which cooperate with the seat rails 12 to form intake openings 62, 63 which are open sidewardly. The intake openings 62, 63 are formed at the lowest positions of the upper face side of the rear fender 23.

Figure 11:
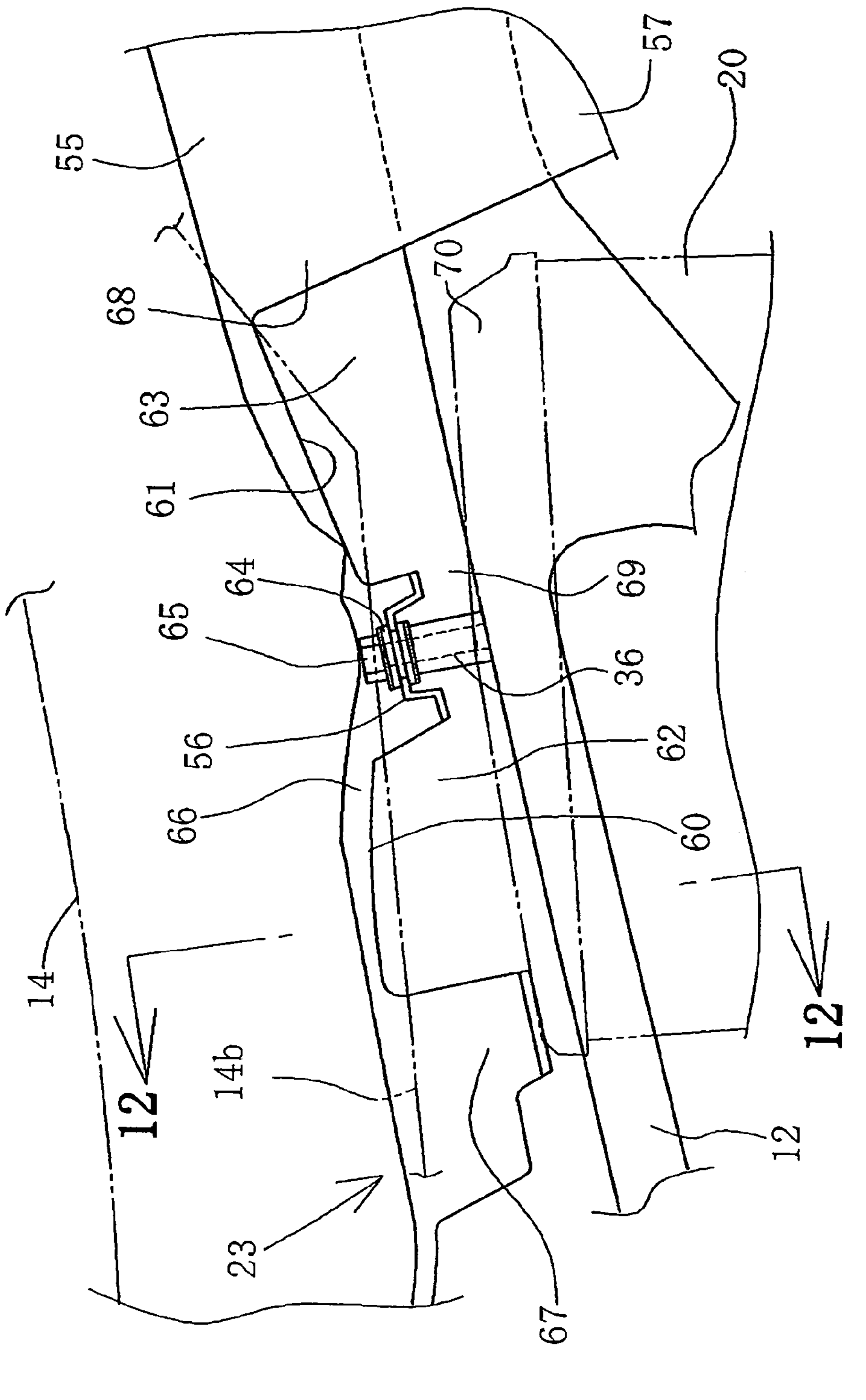
FIG. 11 is a plane view showing an intake opening.

FIG. 11 is an enlarged scale plan view depicting the attaching structure between a seat rail 12 and an attaching portion 56. The attaching portion 56 has an attachment face curved so as to extend substantially in parallel to the upper face of the seat rail 12. The attaching portion 56 is placed at the attachment face thereof on an attaching boss 36 which projects upwardly from the upper face of the seat rail 12 and is fastened for vibration absorption to the attaching boss 36 with a rubber member 64 interposed therebetween by means of a bolt 65 (refer to FIG. 3).

The portions of the edge portion of the central opening 55*a* at which the attaching portions 56 and the cutaway portions 60, 61 are provided form a vertical wall portion 66. A bottom portion of a front side portion 67 of the vertical wall portion 66 on the opposite side of the cutaway portion 60 with respect to the attaching portion 56 is swollen to the upper face of the seat rail 12, but it forms a small gap from the upper face of the seat rail 12. Similarly, a rear side portion 68 of the vertical wall portion 66 on the opposite side with respect to the cutaway portion 61 continues to the box portion 57.

Since a lower end portion of the vertical wall portion 66 connects at a portion (attaching portion 56) thereof to the upper face of the seat rail 12, it forms a connecting face to the seat rail 12. The cutaway portions 60, 61 are formed by cutting away the vertical wall portion 66 upwardly from a lower end portion, and as a result, openings serving as the intake openings 62, 63 are formed between the lower end portion of the vertical wall portion 66 and the seat rail 12. The intake openings 62, 63 are formed over a substantial range of the vertical wall portion 66 in the forward and backward direction, and a plurality of such intake openings 62, 63 exist which are separated forwardly and backwardly by the attaching portion 56 and the attaching boss 36.

Figure 12:
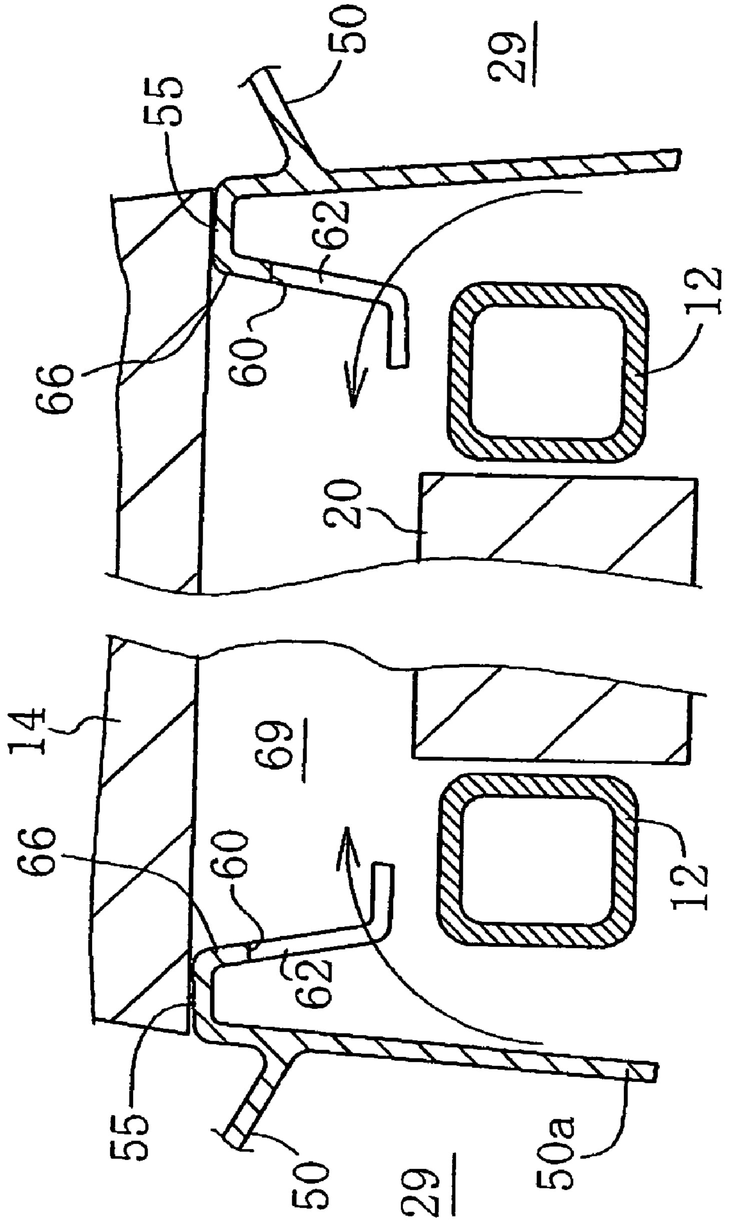
FIG. 12 is a plane view showing a section taken along line 12-12 of FIG. 11 in principle.

FIG. 12 is a schematic sectional view showing a cross section taken along line 12-12 of FIG. 11 in principle. A space surrounded by the left and right vertical wall portions 66, seat 14 and air cleaner 20 forms an intake air path 69, which continues to the intake air path provided around the intake duct 24 (FIG. 6). The vertical wall portions 66 are positioned on the inner side of the downwardly swollen portions 50*a* of the body portions 50, and the intake openings 62 formed from the cutaway portions 60 communicate the intake air path 69 on the inner side and the external air space on the inner side of the downwardly swollen portions 50*a*.

External air is introduced from the space on the inner side of the downwardly swollen portions 50*a* into the intake air path 69 from sidewardly of the vehicle body through the intake openings 62. The intake openings 62 are open at positions at which they are prevented from being observed from sidewardly of the vehicle body by the downwardly swollen portions 50*a*. Besides, since the intake openings 62 are open at a comparatively high position above the seat rails 12, even if the vehicle body is sunk under the water to a location in the proximity of the seat rails 12, the intake openings 62 do not suck in water and the vehicle body can travel in a halfway submerged state.

Also the intake openings 63 are formed substantially similarly to the intake openings 62. However, the intake openings 63 do not overlap at portions thereof with the downwardly swollen portions 50*a* and can be visually observed from sidewardly of the vehicle body (refer to FIG. 8). However, since the openings are positioned at deep places which are on the inner side of the rear wheels 8 and are covered with the body portions 50, the openings are little noticed. Thus, the intake openings 63 are open at positions at which they do not disturb the appearance.

The left and right intake openings 62 are provided on the inner side with respect to the left and right wheel well 29 and communicated with the intake air path 69. Further, though not shown in FIG. 12, the left and right intake openings 63 are provided in an opposing relationship to the left and right wheel well 29 (FIG. 8). The wheel well 29 are for the rear wheels and provide spaces in which the rear wheels 8 are covered with the rear fender 23. It is to be noted that the opening areas, formation positions and so forth of the intake openings 62, 63 can be set arbitrarily in accordance with an object in design, and also the numbers of them may be any of a single number and a plural number. Further, the shapes, dimensions, numbers, positions and so forth of them may be formed asymmetrically on the left and right of the vehicle body, and they may not necessarily be provided within the wheel well 29 or in an opposing relationship to the wheel well 29.

The operation of the present embodiment is now described. As seen in FIG. 12, the intake air path 69 is formed between the upper face of the air cleaner 20 and the bottom face of the seat 14. The intake air path 69 is communicated with the outside through the intake openings 62, 63 which are open sidewardly of the vehicle body at the connecting faces between the seat rails 12 and the rear fender 23.

Accordingly, external air is introduced from outwardly of the vehicle body into the intake air path 69 above the air cleaner 20 through the intake openings 62, 63. Since the intake air path 69 is communicated with the intake air path formed between the location above the dust cover 25, which covers the intake duct 24 from above, and the bottom face of the seat, the air entering the intake air path 69 is sucked immediately into the air cleaner 20 from the end of the intake duct 24.

Therefore, the intake air path from the intake openings 62, 63 to the intake duct 24 is minimized as far as possible and the intake efficiency is improved. Further, since a plurality of intake openings 62, 63 are provided with a great width, the intake efficiency is further raised.

Besides, since the intake openings 62, 63 are open at a comparatively high position above the seat rails 12, the structure is favorable to a four-wheeled buggy having a manner of use wherein it travels in a half-sunk state in the water on a swampy place.

Further, since the left and right intake openings 62 are provided on the inner side with respect to the left and right wheel well 29 and the left and right intake openings 63 are provided in an opposing relationship to the left and right wheel wells 29, they are little observed from the outside of the vehicle body. Or, even if they can be observed, since they are at deep positions on the inner side of the body portions 50 and besides at places which are outer peripheral portions of the rear wheels and at which they little disturb the appearance, also the appearance is improved. Although, particularly to the rear fender 23 which is a design part to the appearance of which importance is attached, it is likely to make the design process difficult to form an opening for intake on a side face, this problem can be solved readily.

Further, since it becomes possible to form the left and right intake openings 62 at a comparatively high position of the side faces of the vehicle body, minimization in length of the intake air path in the case of side face intake can be achieved as far as possible. Furthermore, a large amount of air can be introduced through the spaces and so forth in the proximity of the left and right wheel wells 29. Besides, since the intake openings 62, 63 can be formed over a comparatively large range along the seat rails 12, a plurality of them can be formed readily, and it is possible to increase the opening area of the intake openings to raise the intake efficiency.

Further, since the dust cover 25 can be locked using the locking projection 41 provided on the connecting tube 19 and the damper brackets 30 provided on the seat rails 12, the number of newly provided locking structures can be reduced and the structure of the vehicle body can be simplified. Besides, dust and so forth which may mix into intake air can be removed efficiently.

Figure 13:
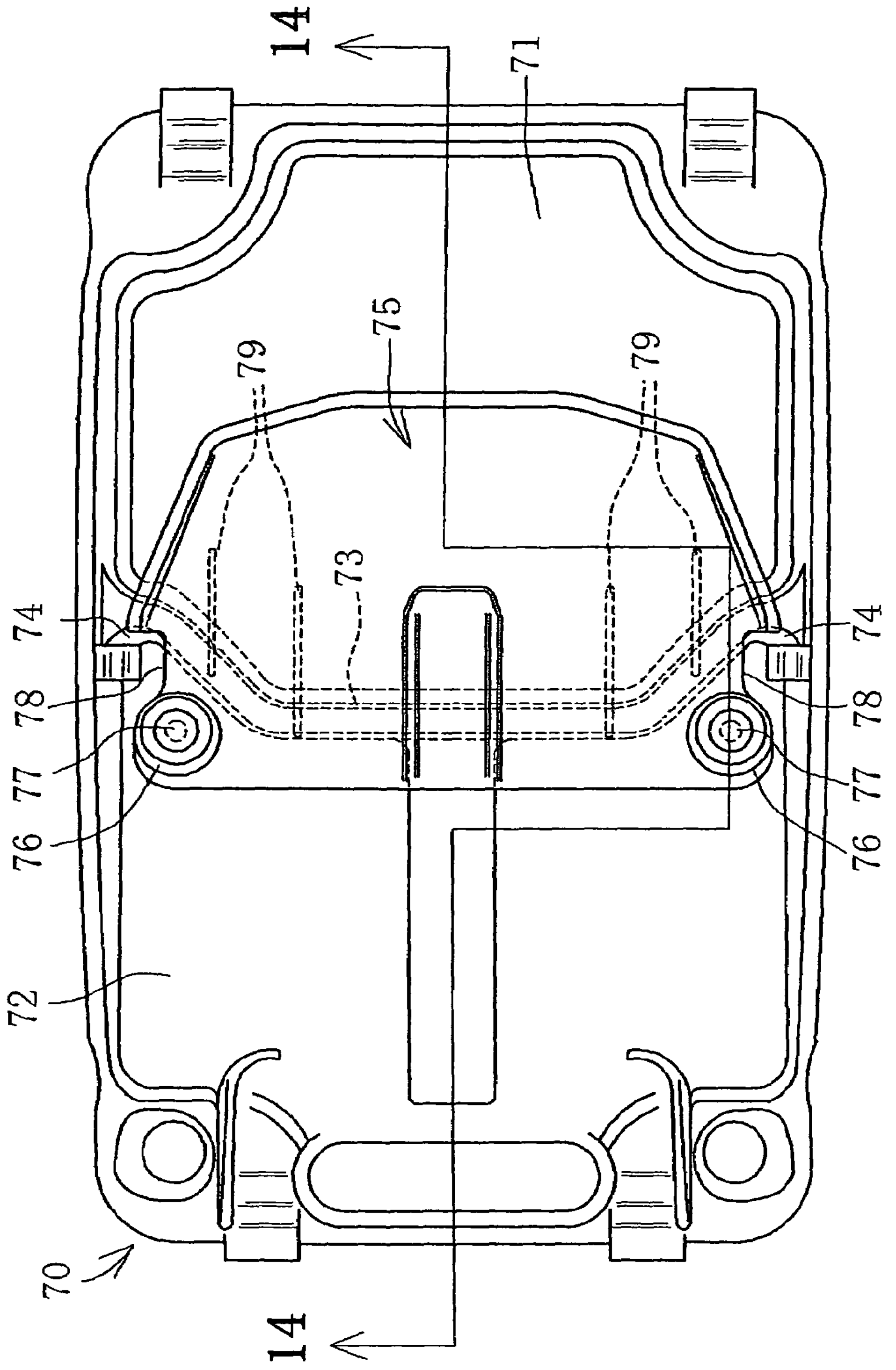
FIG. 13 is a plane view of an air cleaner according to another embodiment.
Figure 14:
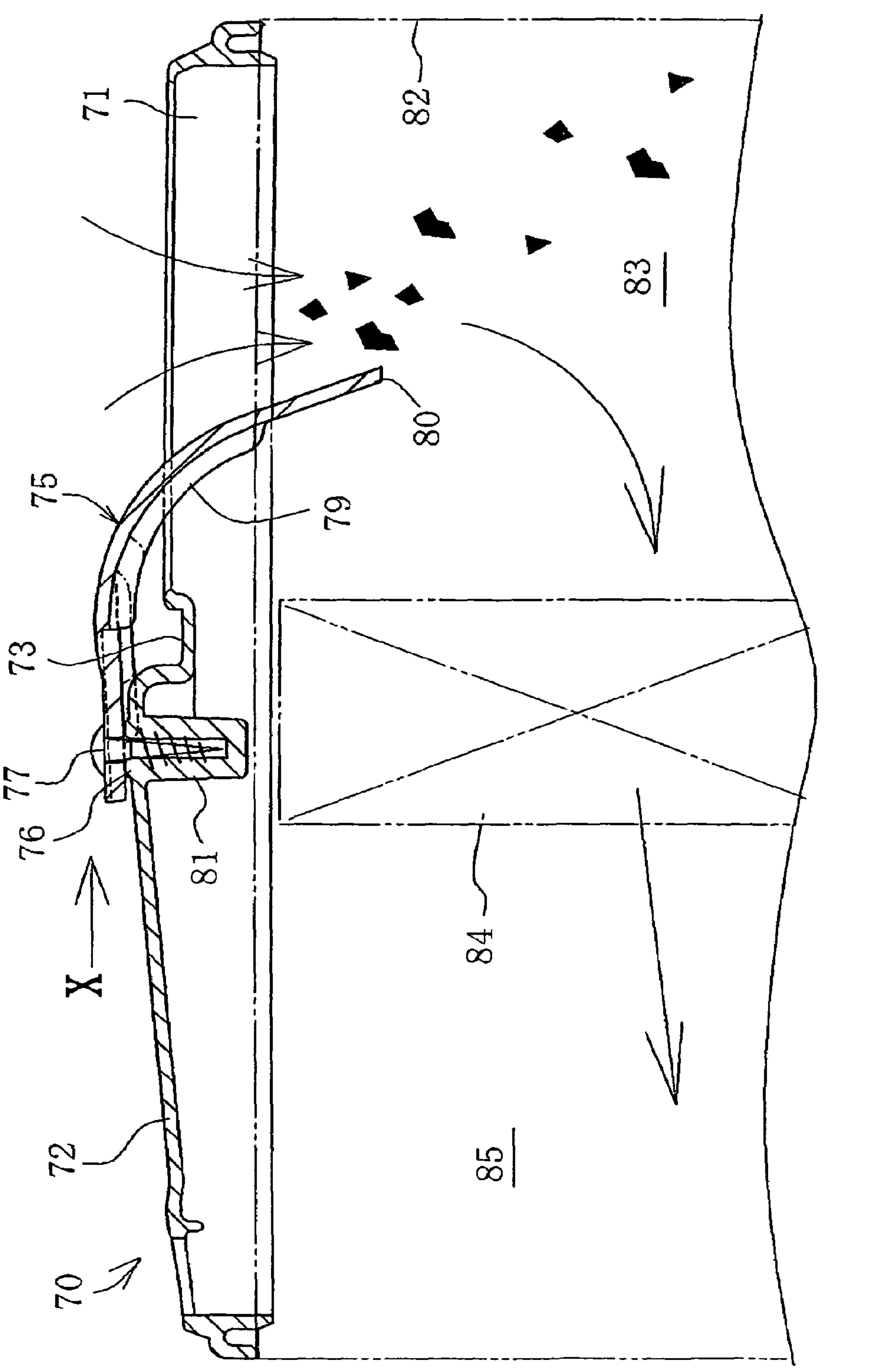
FIG. 14 is a sectional view taken along line 14-14 of FIG. 13.
Figure 15:
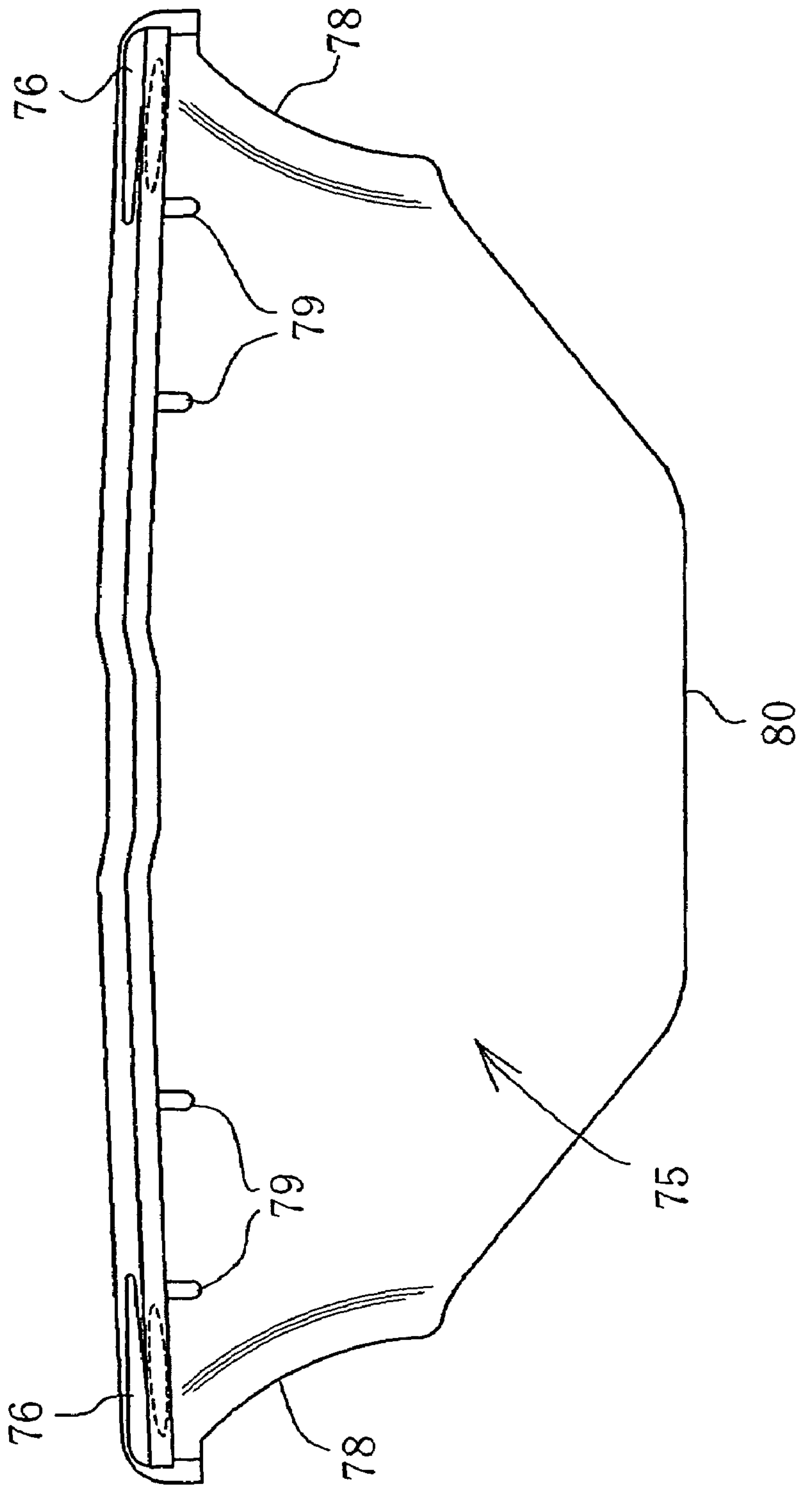
FIG. 15 is a plane view showing a tongue piece as viewed in the direction indicated by an arrow mark X in FIG. 14.

Another embodiment of the air cleaner is shown in FIGS. 13 to 15. The air cleaner 20 in the present embodiment is formed for a racing vehicle, and a large intake opening (upper lid opening) 71 is formed on the rear half side of an upper lid 70 such that it has an area equal to approximately ½ that of the upper lid 70. The front half side of the upper lid 70 is covered with a ceiling portion 72. A rear end portion of the ceiling portion 72 which is opposed to the upper lid opening 71 has a bead-like offset portion 73, which extends leftwardly and rightwardly across a central portion in the forward and backward direction of the upper lid 70. Further, stepped portions 74 are formed on the left and right of the ceiling portion such that they extend in the forward and backward direction, and rear end portions of the stepped portions 74 have swollen offsets on the left and right end portions of the bead-like offset portion 73.

A tongue piece 75 is secured at the left and right of a front end portion thereof to the ceiling portion 72, using attaching seats 76, by means of screws 77 in the proximity of the bead-like offset portion 73 on the left and right of the ceiling portion 72. Cutaway portions 78 are formed continuously on the rear side of the attaching seats 76 such that the tongue piece 75 is positioned by being swollen escaping the left and right stepped portions 74 to and contacting with rear end portions of the left and right stepped portions 74. The tongue piece 75 is swollen rearwardly in such a manner that it covers the substantially front half side of the opening area of the upper lid opening 71.

As seen from FIG. 14 which is a sectional view taken along line 14-14 of FIG. 13, the tongue piece 75 is formed in a curved shape of substantially ¼ of an arc using a suitable material such as a resin. The tongue piece 75 is reinforced by a suitable number of ribs 79 extending in the forward and backward direction. A rear end portion 80 of the tongue piece 75 is formed as a free end and extends into the upper lid opening 71.

The attaching seats 76 provided on the left and right of the front end of the tongue piece 75 are placed on bosses 81 provided at central portions of the upper lid 70 and integrated with the bosses 81 by means of screws 77. The rear end portion 80 of the tongue piece 75 extends through the upper lid opening 71 into the inside of a dirty side 83 provided at a rear portion in the inside of a lower case 82 of the air cleaner 20. In the lower case 82, a filter element 84 is provided forwardly of the rear end portion 80 and forwardly of the upper lid opening 71 and partitions the inner space of the lower case 82 into the dirty side 83 on the rear side and a clean side 85 on the rear side.

FIG. 15 is a plan view showing a single member of the tongue piece 75 as viewed from forwardly (indicated by an arrow marked X in FIG. 14). The tongue piece 75 has a substantially inverted trapezoidal shape having a width gradually decreasing toward the rear end portion 80 side.

By the configuration, as indicated by arrow marks in FIG. 14, external air is taken into the dirty side 83 from above the upper lid opening 71 and is purified by the filter element 84, whereafter it enters the clean side 85 forwardly. The external air is further supplied from the clean side 85 to the engine through the connecting tube 19 (refer to FIG. 5).

At this time, since the upper lid opening 71 of a large size is provided, a large amount of external air can be taken into the air cleaner 20, and consequently, the intake efficiency is improved. Besides, since the tongue piece 75 is provided, it interrupts mud or water flying thereto together with external air so that the mud or water may be less likely to directly arrive at the filter element 84. Consequently, the mud, water or the like is separated much from the air by the tongue piece 75 and drops into the dirty side 83. Accordingly, while a large amount of external air is taken in, the filter element 84 can be protected efficiently.

Accordingly, the intake structure described above is suitable as an intake structure for a racing vehicle which requires an air cleaner 20 of a large capacity. It is to be noted that, although the intake duct 24 shown in FIG. 6 can be omitted, if it is used, then the intake efficiency can be further improved and besides it is possible to cause the intake duct 24 to function as a snorkel.

It is to be noted that the invention of the present invention is not limited to the embodiment described above but can be applied and modified in various forms. For example, the vehicle to which the invention of the present application is directed is not only a saddle type vehicle but also vehicles of various types such as a seat type vehicle like a scooter. The vehicle body cover member is not limited to the rear fender, but various vehicle body covers can be applied similarly. In this instance, it is only required that the vehicle body cover have, at portions thereof, an intake air path wall portion and an intake opening and an opening covering portion for covering the intake opening is provided. Further, the intake system support member is not limited to the seat rail, but the main frame or the like can be used suitably. Furthermore, the opening direction of the intake opening is not limited to a side face of the vehicle body, but the intake opening may otherwise be directed forwardly or backwardly or the like.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention claimed is:

1. An intake system structure for a vehicle, comprising:

a vehicle body frame;

an intake system support member for supporting an intake system part, where the intake system support member is positioned on an inner side of the body frame; and a vehicle body cover member for covering an outer side of the intake system support member, wherein an intake air path is formed on the inner side of the vehicle body cover member, the vehicle body cover member includes, at a portion thereof, an intake air path wall portion which forms part of a wall portion of the intake air path, and the intake air path wall portion is supported at an end portion thereof on the intake system support member of the vehicle body frame such that an opening is formed between the end portion of the intake air path wall portion and the intake system support member so as to serve as an intake opening for establishing communication between the external air and the intake air path, the outer side of at least part of the intake opening is covered with the outer portion of the vehicle body cover member, and the vehicle body cover member is a rear fender which covers a rear wheel of the vehicle.

2. The intake system structure for a vehicle according to claim 1, wherein the intake system support member is a pair of left and right seat rails provided for supporting a seat;

the intake air path wall portion is a pair of left and right vertical wall portions provided at a position of the rear fender below the seat and extending along the left and right seat rails;

the intake air path is surrounded by the seat, intake system part and left and right vertical wall portions; and the intake opening is formed from a cutaway portion of each vertical wall portion provided adjacent a connecting face of the vertical wall portion to the seat rail.

3. The intake system structure for a vehicle according to claim 2, wherein a plurality of such intake openings are provided between the seat rails and the rear fender.

4. The intake system structure for a vehicle according to claim 2, wherein the intake opening is open toward a side of the vehicle body.

5. The intake system structure for a vehicle according to claim 2, wherein the intake opening is provided at the lowest positions of an upper face side of the rear fender.

6. The intake system structure for a vehicle according to claim 1, wherein the intake system part includes, an air cleaner, a connecting tube for the air cleaner, and a dust cover, wherein the dust cover is disposed between a left portion and a right portion of the vehicle body frame, and the dust cover is configured as a restraining device, causing the intake duct to control the flow of air.

7. The intake system structure for a vehicle according to claim 6, wherein the dust cover is locked to support brackets provided on the left and right vehicle body frames and an engaging projection provided on the connecting tube.

8. An intake system structure for a vehicle according to claim 2, wherein the intake system part includes, an air cleaner, a connecting tube for the air cleaner, and a dust cover, wherein the dust cover is disposed between left and right vehicle body frames, and the dust cover is configured as a restraining device, causing the intake duct to control the flow of air.

9. An intake system structure for a vehicle according to claim 8, wherein the dust cover is locked to support brackets provided on the left and right vehicle body frames and an engaging projection provided on the connecting tube.

10. An intake system structure for a vehicle according to claim 1, wherein the intake opening is formed from a cutaway portion provided in an opposing relationship to a wheel well.

11. An intake system structure for a vehicle according to claim 1, wherein the intake opening is provided on an inner side of left and right wheel wells.

12. An intake system structure for a vehicle according to claim 1, wherein the intake system part includes an air cleaner, and an upper lid opening opened for air intake is provided in an upper lid of the air cleaner.

13. An intake system structure for a vehicle according to claim 12, wherein the upper lid opening has an area equal to approximately ½ the area of the upper lid of the air cleaner.

14. An intake system structure for a vehicle according to claim 12, wherein a front half side of the upper lid is covered with a ceiling portion, and a rear end portion of the ceiling portion which is opposed to the upper lid opening has a bead-like offset portion, which extends leftwardly and rightwardly across a central portion in the forward and backward direction of the upper lid.

15. An intake system structure for a vehicle according to claim 12, wherein the left and right of the ceiling portion includes a plurality of stepped portions, wherein the stepped portions extend in the forward and backward direction, and the rear end portion of the stepped portions have swollen offsets on left and right end portions of a bead-like offset portion.

16. An intake system structure for a vehicle according to claim 12, wherein a member for protecting a filter element provided in the air cleaner from mud, water and so forth is provided in the upper lid opening.

17. An intake system structure for a vehicle, comprising a vehicle body frame;

a seat rail positioned on an inner side of the body frame for supporting at least an air cleaner, a connecting tube, and a dust cover;

a rear fender for covering an outer side of the seat rail, wherein an intake air path is formed on an inner side of the rear fender, and the rear fender includes, at a portion thereof, an intake air path wall portion which forms part of a wall portion of the intake air path, and the intake air path wall portion is supported at an end portion thereof on the seat rails of the vehicle body frame such that an opening is formed between the end portion of the intake air path wall portion and the seat rail so as to serve as an intake opening for establishing communication between external air and the intake air path.

18. An air cleaner apparatus for a vehicle of the saddle type wherein an engine is placed at a substantially central location of a vehicle body frame while wheels with a wide extra-low pressure tire are mounted at front and rear portions of said vehicle body frame and a fuel tank and a saddle type seat are carried in order rearward of a steering handlebar member above said engine, said apparatus comprising:

surrounding side faces of said fuel tank are covered at least over a range from an upper portion to an upper surface thereof continuously with a tank cover, a front portion of a lower end opening of a space defined by an outer surface of a rear wall of said fuel tank and an inner surface of a rear wall of said tank cover is closed up with a shield member to form a substantially enclosed space, wherein the outer surface of the rear wall of said tank cover is covered with a front portion of said seat, an air cleaner body is disposed below said seat, an intake duct which extends forward and upward from a front portion of an upper surface of said air cleaner body is opened in the proximity of a rear end in said substantially enclosed space in such a manner as to project upward from said shield member, wherein a lower end of the rear wall of said tank cover is extended downwardly in such a manner as to cover a rear side of the opening of said intake duct, and wherein a distance is provided between an inner surface of said tank cover and an outer surface of each of left and right corner portions of an upper surface of said fuel tank so as to form an air introducing path in a shape extending in a forward and backward direction and elongated forward and backward for introducing external air from a forward direction of said vehicle into the substantially enclosed space.

* * * * *